J. G. WHITLOCK.
Steam Oven.
No. 52,235.
Patented Jan'y 23, 1866.
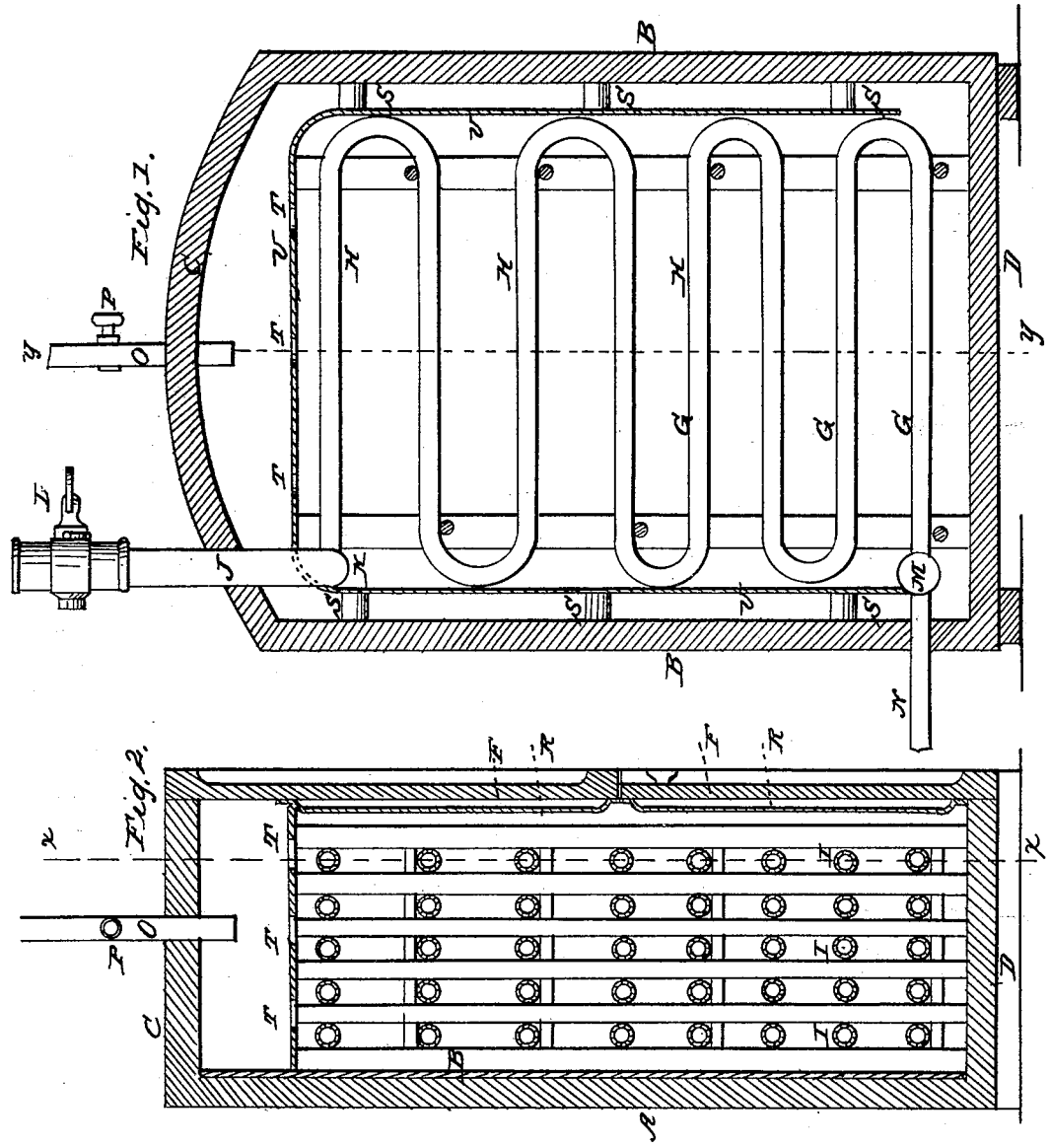

UNITED STATES PATENT OFFICE.

J. G. WHITLOCK, OF NEW YORK, N. Y.

STEAM-OVEN.

Specification forming part of Letters Patent No. 52,235, dated January 23, 1866.

*To all whom it may concern:*

Be it known that I, J. G. WHITLOCK, of the city, county, and State of New York, have invented a new and useful Improvement in Steam-Ovens; and I do hereby declare that the following is a full, clear, and exact description thereof, which will enable others skilled in the art to make and use the same, reference being had to the accompanying drawings, forming part of this specification, in which—

Figure 1 is a vertical longitudinal section of the oven through the line $x\ x$, Fig. 2. Fig. 2 is a vertical cross-section of the oven through the line $y\ y$, Fig. 1.

The object of my invention is to furnish an oven in which the baking may be done by steam; and it consists in heating the oven by a coil of steam-pipes so arranged that the pipes themselves shall constitute the shelves to support the articles to be baked, and in so aranging an inner casing or lining in combination with the walls of the oven and the coils of steam-pipe as to produce a circulation of heated air within the oven, as hereinafter more fully described.

I construct the back A, sides B, top C, and bottom D of the oven of brick-work in the ordinary manner and of a size commensurate with the desired capacity of the oven in each particular case. The front E of the oven may be brick-work, with openings for the insertion of the necessary door-frames and doors; but I prefer to make the front of the oven of iron, with doors F sufficently large to allow of convenient access to all that part of the oven in which the baking is done, so that the front can be conveniently removed for inserting the lining and building the coil. I then construct a coil of steam-pipes of inch diameter, said coil to be of such size, in a moderately-large oven, that each horizontal layer shall consist of eight parallel pipes, and each vertical layer shall consist of ten or twelve parallel pipes. The horizontal layers G in the lower part of the coil should be close together, so as to form a close coil; but the four upper horizontal layers, H, should be so far apart as to allow the articles to be baked to be inserted between them, the horizontal layers H forming shelves upon which the articles to be baked rest while baking. The vertical layers I, or, which is the same thing, the pipes composing each horizontal layer, should not be in contact, but at the distance apart which will supply the greatest amount of heat. The ends of the pipe forming the upper horizontal layer, H, terminate in the branch pipe J, through which the steam enters the coil. The pipe J enters vertically through the top C of the oven, turns at right angles at the point K, and terminates near the back wall, A, of the oven. The pipe J is furnished with a stop-cock, L, to admit or shut off the steam, as in ordinary steam-pipes. The ends of the pipes forming the lowest horizontal layer, G, also terminate in a branch pipe, M, from which a pipe, N, conducts the steam and water to a steam-trap; or the steam may be conducted to any other place and be used again.

O is a small pipe furnished with a stop-cock, P, leading through the top wall, C, of the oven into the space beneath the top C, by means of which any vapors which may collect at the top of the oven may be allowed to escape.

The back wall, A, the front E, and doors F should be lined with tin, R, or its equivalent, in order more securely to retain the heat within the oven. The sides B and top C should also be lined with tin, U U', or its equivalent; but the lining in this case should be placed at the distance from the walls of about three inches, should be secured to the side walls, B, by means of bolts S, should terminate at the distance of about six inches from the bottom D of the oven, and should have the part which lines the top of the oven perforated with holes, T. By this arrangement the heated air, as it rises, will pass through the openings T in the lining U' into the space V between said lining U' and the top C of the oven; thence, as it becomes cooled by coming into contact with the walls of the oven, it will descend through the spaces W between the lining U and the sides B, and, passing under the lower edge of the lining U, will again ascend through the coil, thus establishing a circulation of heated air through the oven. The increased effect in baking produced by the circulation of the heated air over that produced by air of the same temperature at rest, may be illustrated by the difference in effect produced upon a block of ice by the wind and by still air of the same temperature; and I find by experiment that I can produce effects by means of this circulation that I could not produce without it.

Among the advantages of my invention may be mentioned that the oven can be quickly heated to the desired degree; that the degree of heat can always be kept constant; that the materials baking will not be burned; that a great economy of fuel is effected; that the oven may be used in cases of drying or evaporating, or, when it is necessary, to apply great heat without burning the article submitted to it, and small expense of keeping it in repair, since no part of the oven is exposed to the danger of being burned out.

I claim as new and desire to secure by Letters Patent—

1. An oven heated by a coil of steam-pipe, arranged in a close coil at the lower part of the oven, and in a more open coil at the upper part, so as to allow the pipes themselves to be used as shelves in baking, substantially as described, and for the purpose set forth.

2. Combining with the walls of the oven and with the coil of steam-pipe an inner casing or lining, so arranged as to produce a circulation of heated air within the oven, substantially as described, and for the purpose set forth.

The above specification of my invention signed by me this 18th day of September, 1865.

J. G. WHITLOCK.

Witnesses:
M. M. LIVINGSTON,
C. L. TOPLIFF.